US011030419B1

(12) United States Patent
Cleverley

(10) Patent No.: US 11,030,419 B1
(45) Date of Patent: Jun. 8, 2021

(54) METHOD AND SYSTEM FOR DETECTING NON-OBVIOUS HYDROCARBON PLAYS FROM UNSTRUCTURED TEXT

(71) Applicant: Paul Hugh Cleverley, Wallingford (GB)

(72) Inventor: Paul Hugh Cleverley, Wallingford (GB)

( * ) Notice: Subject to any disclaimer, the term of this patent is extended or adjusted under 35 U.S.C. 154(b) by 0 days.

(21) Appl. No.: 16/600,516

(22) Filed: Oct. 13, 2019

(51) Int. Cl.
*G06F 40/56* (2020.01)
*G06F 40/30* (2020.01)
*G06F 40/284* (2020.01)

(52) U.S. Cl.
CPC ............ *G06F 40/56* (2020.01); *G06F 40/284* (2020.01); *G06F 40/30* (2020.01)

(58) Field of Classification Search
USPC ....................................................... 704/7–10
See application file for complete search history.

(56) References Cited

U.S. PATENT DOCUMENTS

| 2010/0175886 A1* | 7/2010 | Bohacs ................ G01V 99/005 166/369 |
| 2011/0264430 A1* | 10/2011 | Tapscott ................. G01V 99/00 703/10 |
| 2015/0254567 A1* | 9/2015 | Imhof .................... G01V 1/301 703/10 |

* cited by examiner

*Primary Examiner* — Leonard Saint Cyr

(57) ABSTRACT

The invention is a data processing method and system for suggesting non-obvious potential Hydrocarbon Plays from unstructured text. The data processing system detects clues for Hydrocarbon Play Elements in sentences, matches combinatorial patterns (DNA inspired) across sentences and documents to output potential Hydrocarbon Plays. The system also computes a rank for the detected Hydrocarbon Play's non-obvious nature. In particular, the data processing system operates on any digital unstructured text derived from academic literature, company reports, web pages and other sources. Detected Hydrocarbon Plays can be used to stimulate ideation and learning events for geoscientists in the oil and gas exploration industry.

2 Claims, 10 Drawing Sheets

Figure 1:
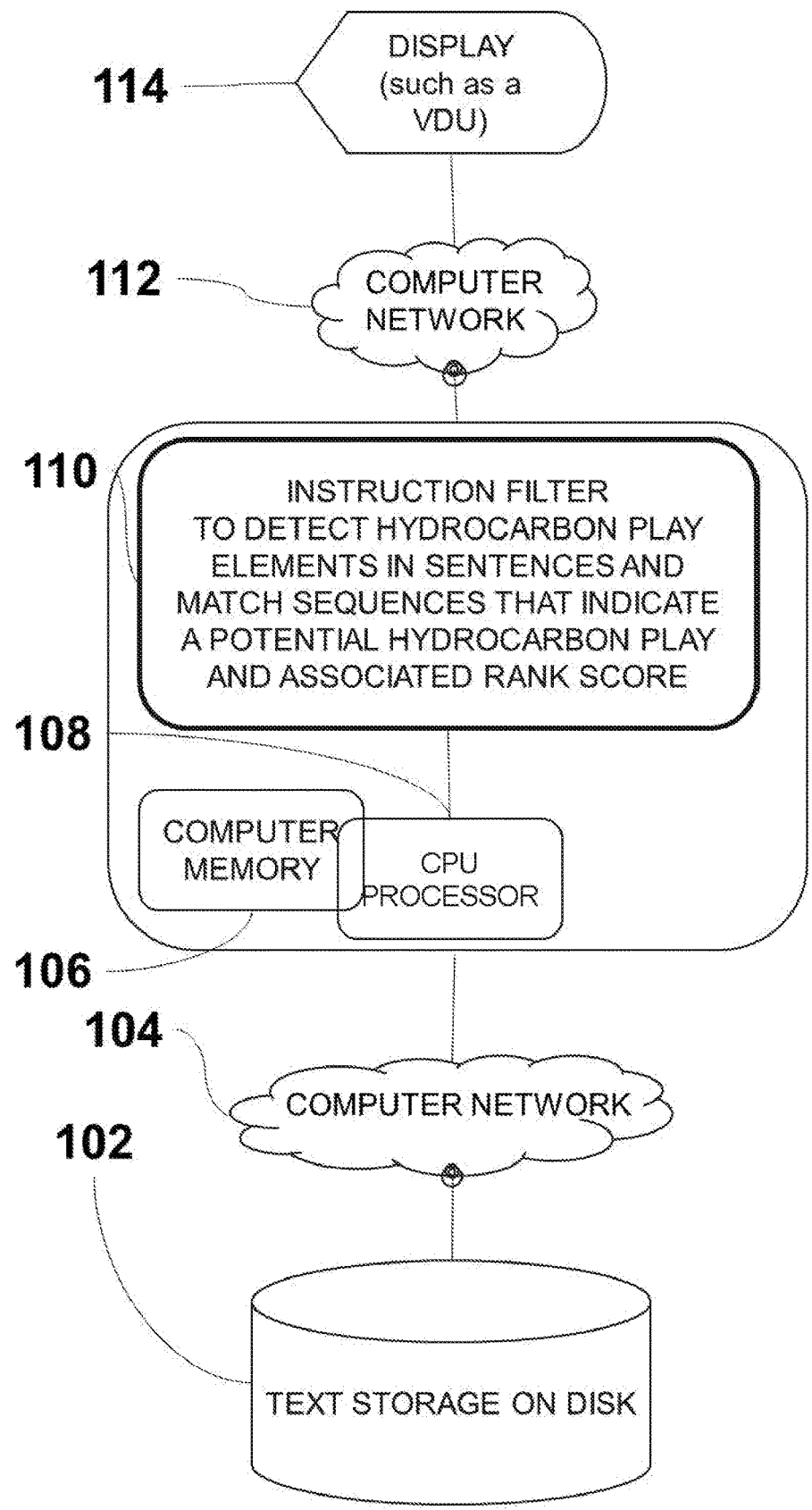

FIG 5.

METHOD AND SYSTEM FOR DETECTING NON-OBVIOUS HYDROCARBON PLAYS FROM UNSTRUCTURED TEXT

CROSS-REFERENCE TO RELATED APPLICATIONS

U.S. Patent Documents

U.S. Pat. No. 7,054,753 B1 (May 2006) Williams and Robinson
Ser. No. 13/451,338 (April 2011) Laake et al
U.S. Pat. No. 8,271,243 B2 (Sep. 2012) Koutsabeloulis et al
Ser. No. 14/434,727 (Sep. 2013) Imhof
U.S. Pat. No. 8,838,428 B2 (Sep. 2014) Tapscott et al
U.S. Pat. No. 8,749,549 B2 (Jun. 2014) Hantschel et al Other Publications Blei, D. M, Ng, A. Y. and Jordan, M. I. 2003. Latent Dirichlet Allocation. Journal of Machine Learning Research 3, pp 993-102.
Cameron, D. et al 2013. A graph-based recovery and decomposition of Swanson's hypothesis using semantic predications. Journal of Biomedical Informatics, 46(2), pp 238-251.
Cleverley, P. H. 2017. Applying Text and Data Mining to Geological Articles: Towards Cognitive Computing Assistants. Paper number 206-6. Geological Society of America (GSA) Annual Technical Meeting Oct. 24, 2017, Seattle, USA. Abstracts with Programs 49(6) doi: 10.1130/abs/2017AM-301926
Cleverley, P. H. 2018. Mining Geological Sentiment from Unstructured Text. Janet Watson Meeting A Data Explosion: Impact of Big Data in Geoscience. Geological Society of London, Feb. 27 to Mar. 1, 2018, London, UK.
Jean-Baptiste, M. et al (2010). Quantitative Analysis of Culture Using Millions of Digitized Books. Science, 331(6014), pp 176-182.
Kastens, K. et al 2009. How Geoscientists Think and Learn. Eos transactions, American Geophysical Union, 90(31), pp 265-266.
Mikolov, T. et al 2013. Efficient Estimation of Word Representations in Vector Space. Computer Science Computation and Language Cornell. Online Article https://arxiv.org/abs/1301.3781v3
Peters, S. E. et al 2014. A Machine Reading System for Assembling Synthetic Paleontological Databases. Plos One. Online Article https://doi.org/10.1371/journal.pone.0113523
Peters, S. E., Husson, J. M. and Wilcots, J. 2017. The rise and fall of stromatolites in shallow marine environments. Geology, 45(6), pp 487-490.
Swanson, D. 1988. Migraine and Magnesium: Eleven Neglected Connections. Perspectives in Biology and Medicine. 31(4), pp 526-557.
Tshitoyan, V. et al 2019. Unsupervised word embeddings capture latent knowledge from materials science literature. Nature, 571, pp 95-98.

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

The method of detecting potential Hydrocarbon Plays from unstructured text and computing a non-obvious rank score has not been disclosed (outside this United States Patent application) in sufficient detail in order to recreate the method.

BACKGROUND OF THE INVENTION

(1) Field of the Invention

The present invention relates generally to geoscience, hydrocarbon exploration, information retrieval, natural language processing and machine learning.

(2) Description of Related Art

Discovering new knowledge from unstructured text is first recorded by Swanson (1988) using manual methods and the 'ABC' technique, in a subject field termed Literature Based Discovery (LBD). The rationale being if concept A is associated to concept B and concept C is associated to concept B, then there is a relationship between concept A and concept C even if it is never explicitly stated in the text.

In these deductive methods some form of lexicon or taxonomy (knowledge representation) known a priori, is applied to text using various algorithms that derive associations between elements from those lexicons and taxonomies.

Automated computer techniques have taken these methods further with the ability to process millions of documents. In addition to deductive techniques, inductive techniques derive concepts and associations directly from complex word association patterns in text; these topics are only known posteriori. Topic Modeling (Blei 2003) is one such technique.

Jean-Baptiste (2010) described how counting occurrences of terms by date, allows inferences to be made on changes in human culture over time. Cameron (2013) applied Graph Theory to Natural Language Processing (NLP) to automate and take Swanson's method to more sophisticated levels in the Biosciences. Tshitoyan (2019) used text embedding trajectories (Mikolov et al 2013) in order to infer new relationships between chemicals in millions of text articles.

Geoscientists have specific characteristics in how they think and learn about the earth system, where patterns in time and space are particularly important for ideation (Kastens et al 2009). Geoscientists also have a latent information need from computer systems to 'show me something I don't already know' to stimulate learning (Cleverley 2018).

In the Geosciences, various deductive approaches have been applied in text mining. Peters et al (2013; 2014) used automated techniques to count the occurrence of fossils by geological age. They showed it was possible to produce profiles over time to challenge existing geoscience theories on the reasons for extinctions and population growth leading to new knowledge creation.

Applying text mining to hydrocarbon exploration, Cleverley (2017) showed how counting the existence of geoscience-based Hydrocarbon Play Elements by geographical location and geological age, it was possible to produce visual summaries and surface outliers useful for industry. Hydrocarbon Plays (where the right combination of Hydrocarbon Play elements combine) were not explicitly computed.

Various methods relating to Hydrocarbon Play analysis and detection have been used. These include visualization (Williams and Robinson 2006), data integration (Laake et al 2011), modelling (Koutsabeloulis 2012) and volumetrics (Tapscott et al 2014). Imhof (2013) described methods for Hydrocarbon Play Element (such as reservoir, seal, trap, source, maturation and migration) detection from seismic and Hantschel et al (2014) described methods for Hydrocarbon Play chance computation from mapping. No prior art exists for the detection of Hydrocarbon Plays from text.

There are three limitations of the text mining methods used by Peters (2013; 204) and Cleverley (2017; 2018). Firstly, concept matches (such as Hydrocarbon Play Elements) that cannot be tied to a geological age are ignored in the counting and aggregating process. Secondly, concepts (such as Hydrocarbon Play Elements) are counted and aggregated independently from one another. Therefore, associations between these concepts outside the sentence boundary are lost, which is important because it is the existence of a combination of Hydrocarbon Play Elements (such as source rock, reservoir and trap) in the same context which leads to a potential Hydrocarbon Play. Finally, in previous methods no differentiation is made between a concept match which is likely to be well known 'common knowledge'. For example, a 'known' statement, 'proven reservoir in the producing Blue Field' versus one which is speculative such as "the formation might have reservoir quality" or implicit "sequence of thick porous sands" evidence for a reservoir.

No prior art method exists to detect Hydrocarbon Play Elements in text, preserving their sequence relative to one another (regardless of whether a Geological age can be detected) and its non-obvious nature; using this sequence pattern to detect potential non-obvious Hydrocarbon Plays. The following section details the invention.

BRIEF SUMMARY OF THE INVENTION

The invention is a data processing method and system for suggesting non-obvious potential Hydrocarbon Plays from unstructured text. The invention detects Hydrocarbon Play Elements in sentences and extracts those along with other contexts including the likelihood the Hydrocarbon Play Element is well known or speculative (non-obvious nature). The relative sequence between sentences where play elements have been detected is preserved, regardless of whether associations to geological age have been made. These data are used to identify combinatorial sequences that suggest potential Hydrocarbon Plays within and across document texts.

The output is a set of potential Hydrocarbon Plays and a rank score indicating the non-obvious nature of the play. These data can be populated into a KnowledgeGraph for further processing or used to drive technology user interfaces (cognitive assistants) for petroleum geoscientists.

There are several aspects embodied within the method derived by the inventor, which through testing and unpublished research has been shown to be beneficial in surfacing potential Hydrocarbon Plays.

This would be useful because there is too much potentially relevant textual information available for geoscientists to read. Therefore, identifying patterns (combinations of Hydrocarbon Play Elements) within texts could spark a learning event and ideation, leading to a new business opportunity that current methods do not allow.

Accordingly, in one aspect, a computer process as implemented, involves receiving sentences from a plurality of sentences and lexicons from a plurality of lexicons in computer memory. These data in the computer memory are processed with a computer processor to detect the existence of Hydrocarbon Play Elements in the sentence. The processor identifies sequences of play elements that are likely to lead to a potential Hydrocarbon Play of a non-obvious nature. A preferred embodiment is using machine learning for disambiguation, NLP, lexicons and a rules-based method. This is achieved by applying a filter to sentences in text reports or web pages and detecting the presence of certain domain clue terms, the level of certainty/speculation present in the sentence and the ordered sequence of detections outside the sentence, in order to detect patterns that indicate a potential Hydrocarbon Play.

In another aspect, a computer program utilizes computer disk (storage) in which instruction code resides. These instructions when processed by a computer, instruct the computer to detect Hydrocarbon Play Elements and sequences that represent potential Hydrocarbon Plays, ranking them based on their non-obvious nature. The techniques could be implemented in digital circuitry, hardware, firmware or software. The techniques can be implemented in a computer program written in any form of programming language and on any operating system. Additional embodiments could include one or more computer devices configured to carry out the instructions.

BRIEF DESCRIPTION OF THE SEVERAL VIEWS OF THE DRAWING(S)

The figures attached form part of the specification, further explain the invention and supported by the detailed description, explain the principles of the present invention.

FIG. 1—Diagram illustrating the system architecture.

Figure 2:
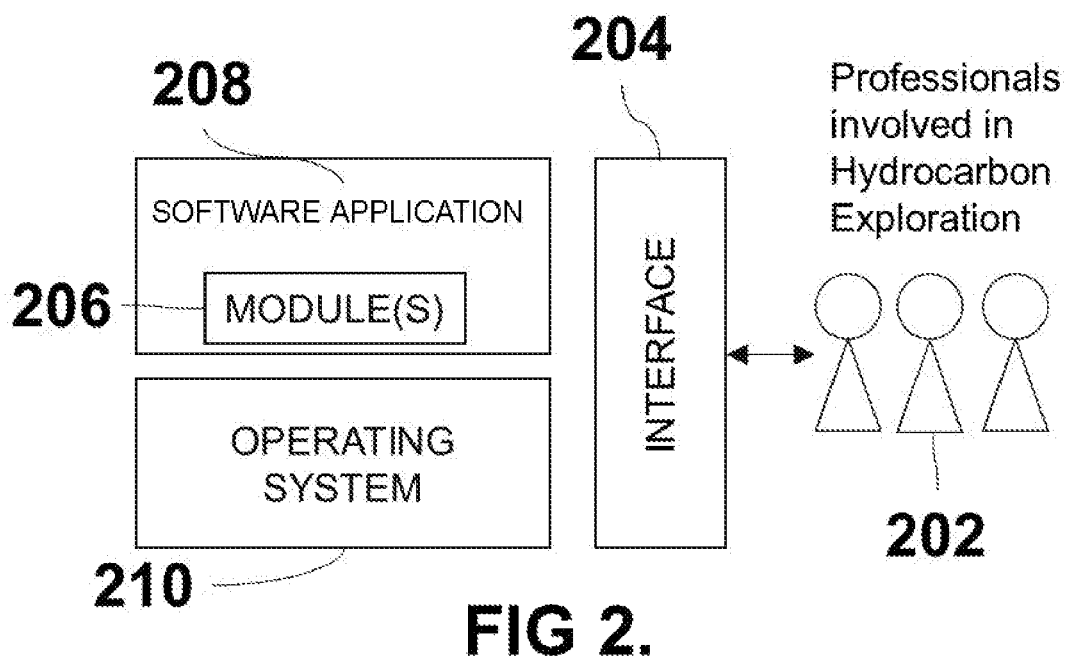

FIG. 2—Schematic illustrating the software system, modules, operating system and user interface.

Figure 3:
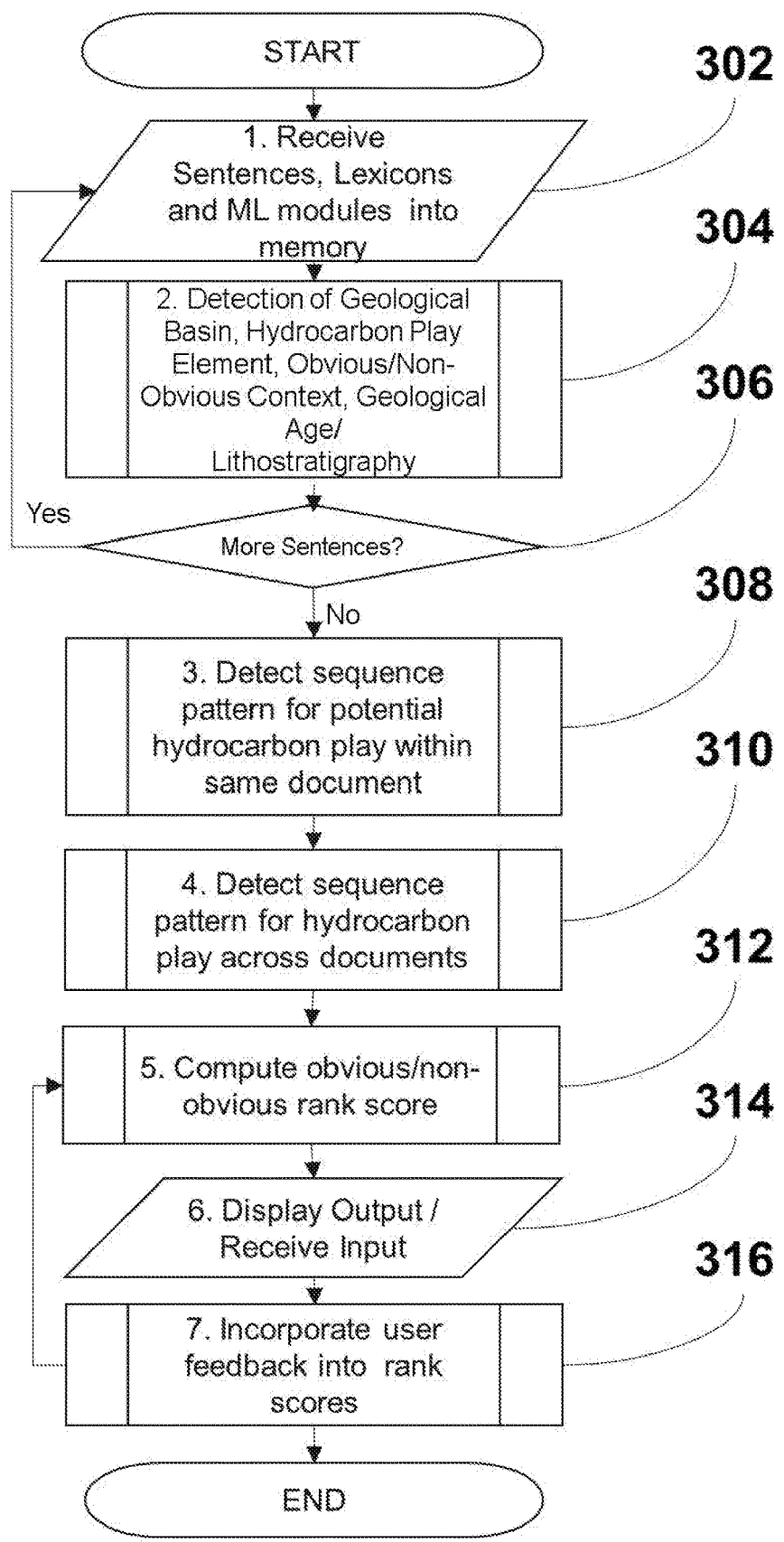

FIG. 3—High level flowchart of operations summarizing the detection of Hydrocarbon Play Elements and computation of potential Hydrocarbon Plays in accordance with a preferred embodiment.

Figure 4:
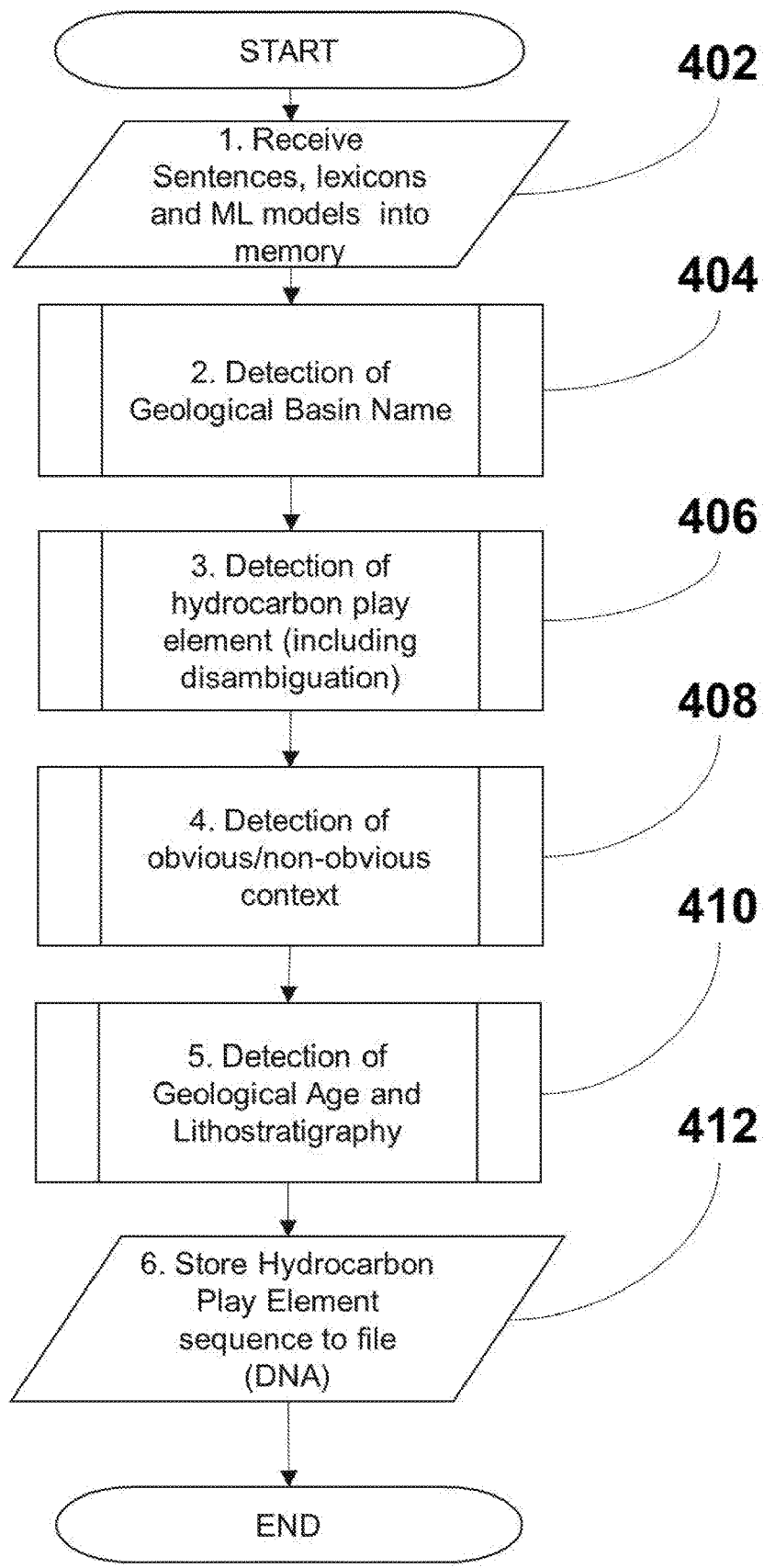

FIG. 4—Flow chart describing the detection of Hydrocarbon Play Elements and context.

Figure 5:
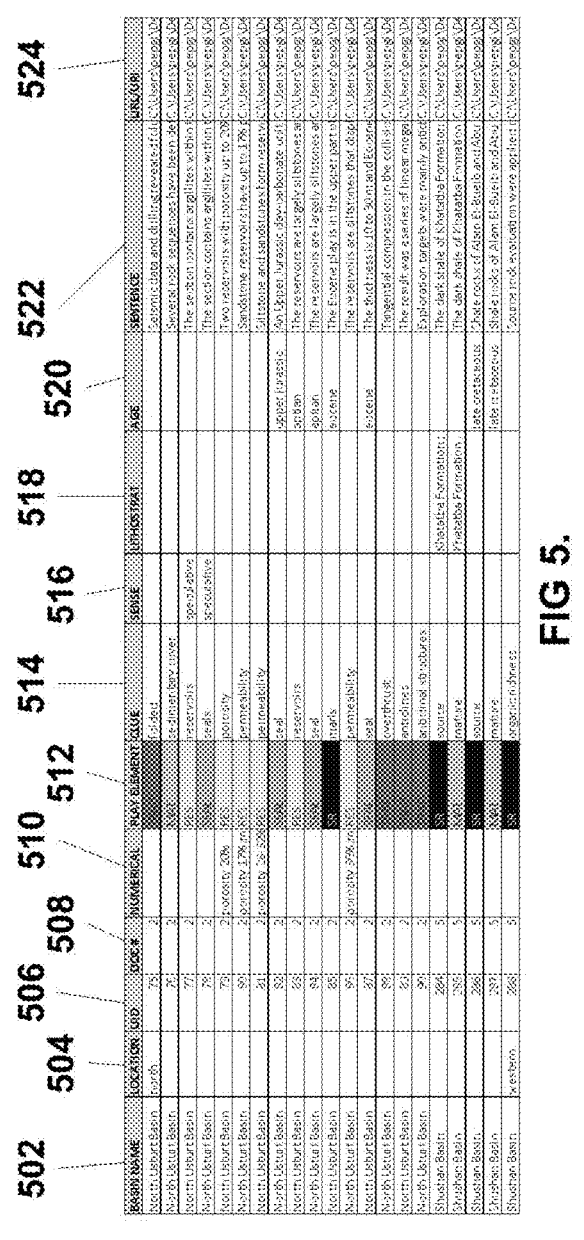

FIG. 5—Sample output from the method detecting Hydrocarbon Play Elements and context (Hydrocarbon Play Element DNA).

Figure 6:
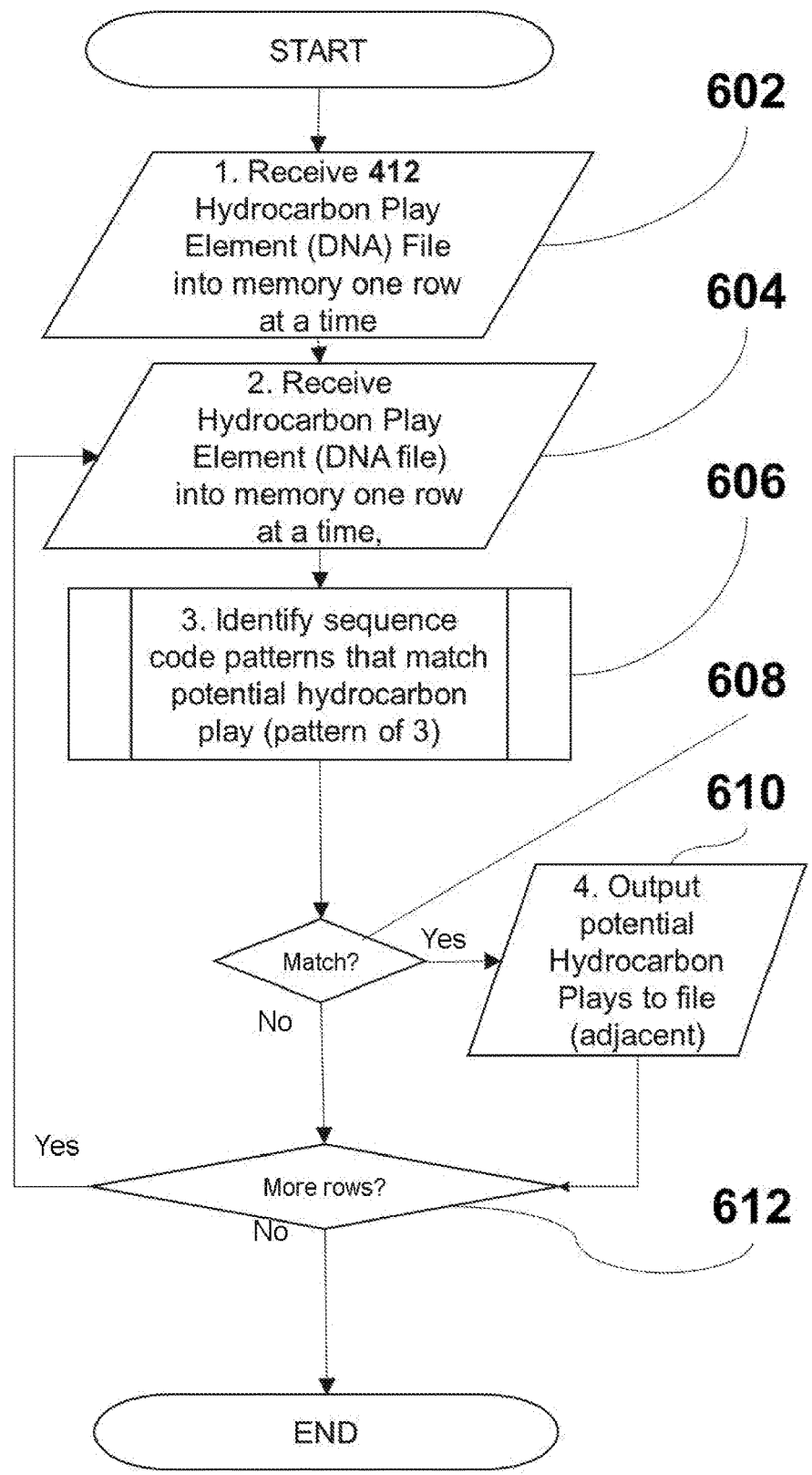

FIG. 6—Flow chart describing the detection of Hydrocarbon Plays in a document.

Figure 7:
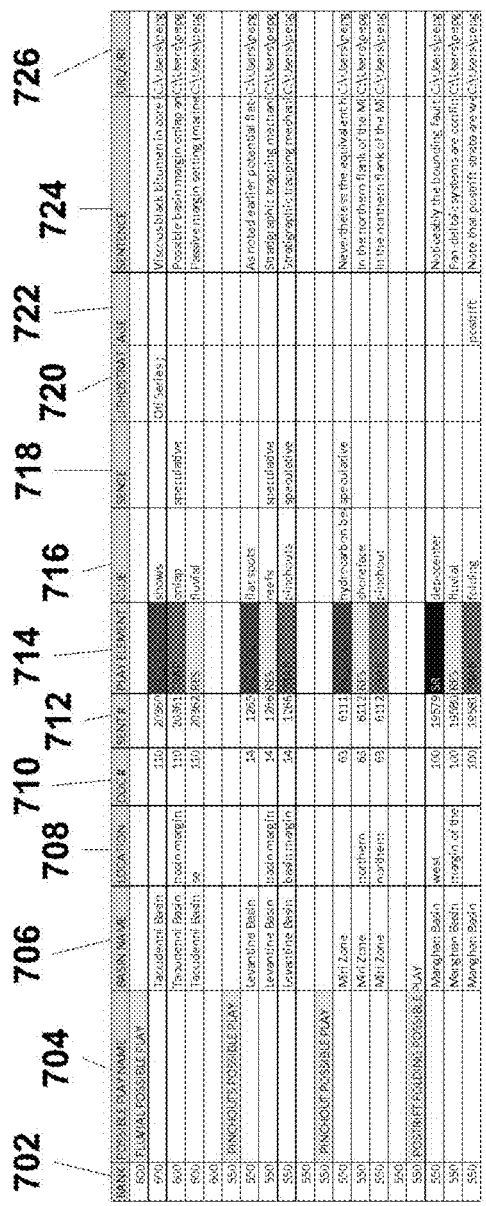

FIG. 7—Sample output from the method detecting potential Hydrocarbon Plays in a document.

Figure 8:
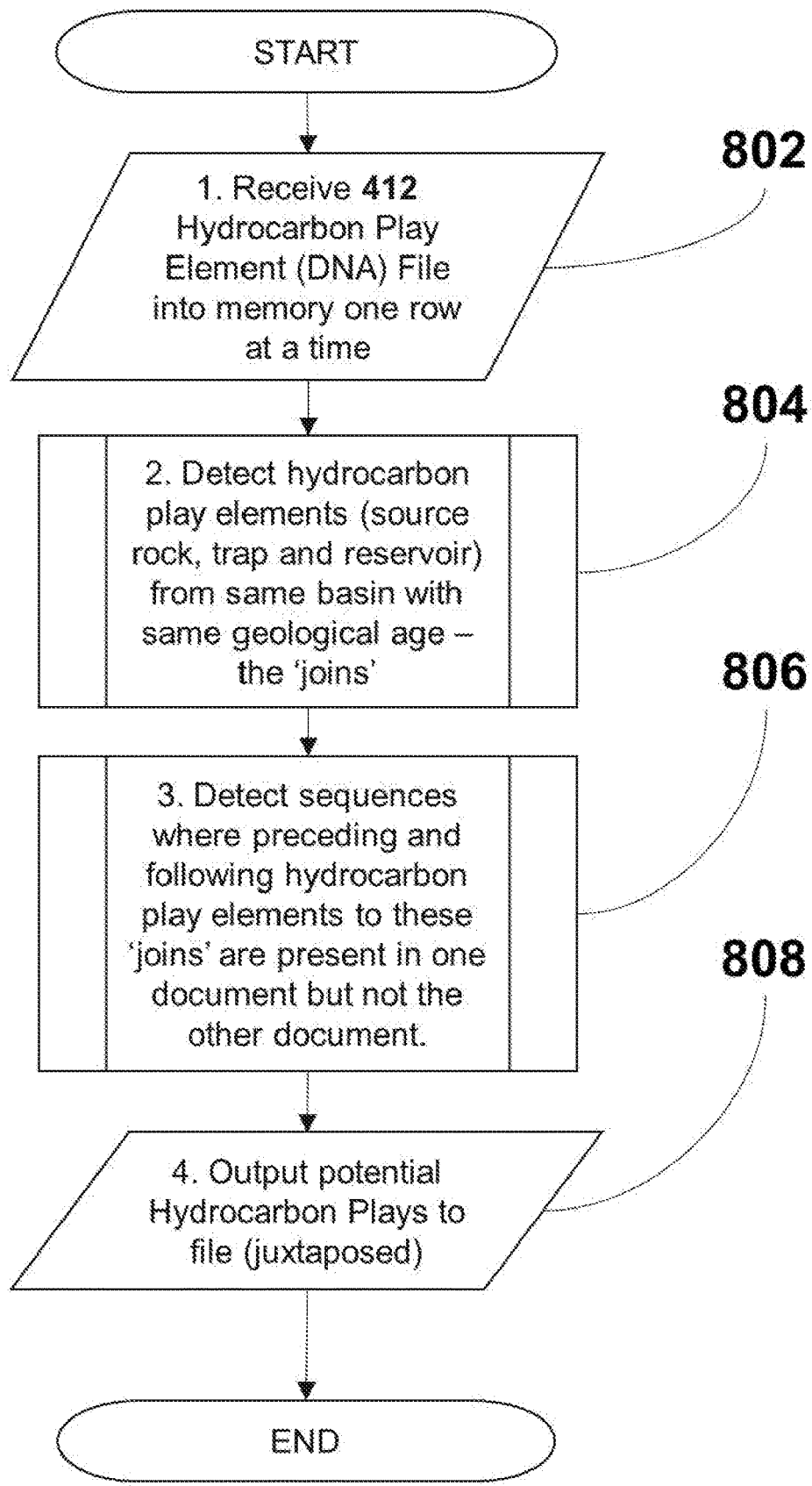

FIG. 8—Flow chart describing the detection of Hydrocarbon Plays across documents.

Figure 9:
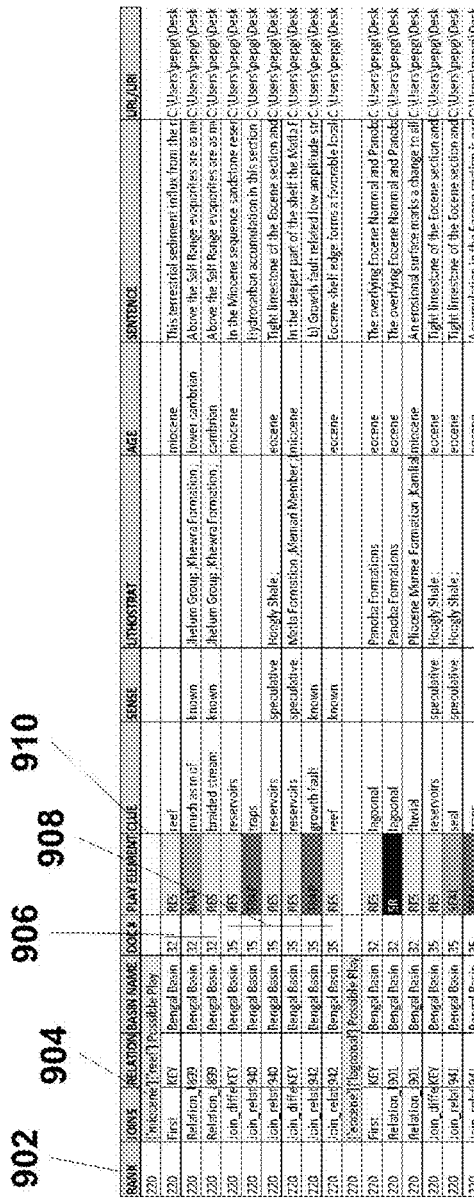

FIG. 9—Sample output from the method detecting potential Hydrocarbon Plays across documents.

Figure 10:
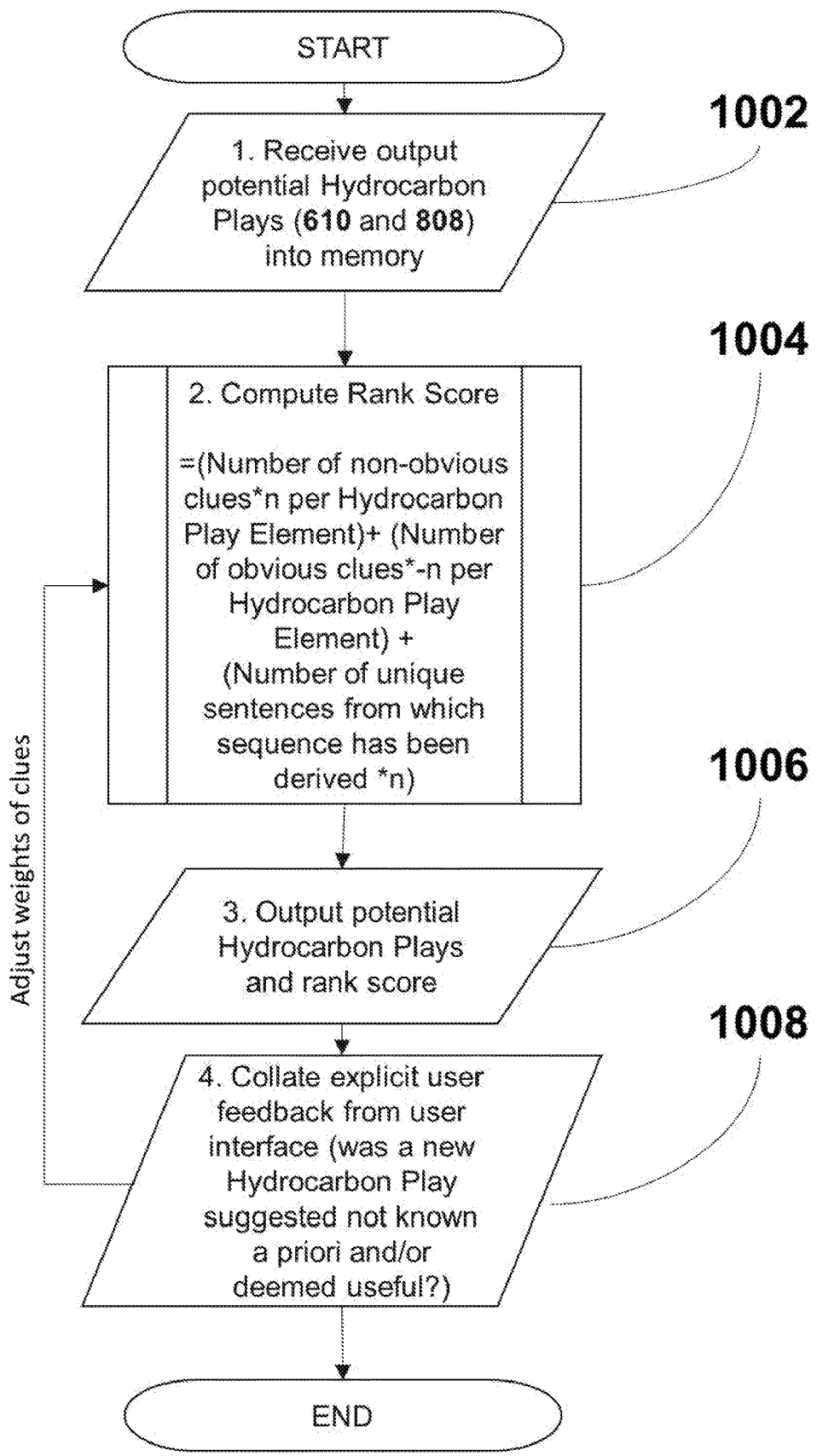

FIG. 10—Flow chart describing the computation of a Hydrocarbon Play rank score based on its non-obvious nature.

DETAILED DESCRIPTION OF THE INVENTION

The various values and configuration discussed in the following sections can be varied and are listed just to illustrate one embodiment. The invention may be embodied in several different forms and should not be taken as limited to the embodiments disclosed. The disclosed embodiments address the computation of non-obvious Hydrocarbon Plays from sentences in petroleum geoscience text. The disclosed embodiments are provided by way of illustration to ensure thorough disclosure and the nature of the inventions to people skilled in the art.

In this document the following definitions are used. A Hydrocarbon Play consists of the combination of Hydrocarbon Play Elements (source rock, maturation, migration, reservoir, seal and trap) necessary to form a hydrocarbon (oil and gas) accumulation. Each Hydrocarbon Play Element is necessary but not sufficient on their own to form a Hydrocarbon Play.

Encountering explicit Hydrocarbon Play Element terms in documents, such as 'source rock', 'trap', 'reservoir', along with statements on their nature, such as 'proven reservoir', are likely to be obvious (known) to geoscientists working that area. Terms and phrases such as 'shoreface sands' with statements such as 'pathways might exist' are more speculative and non-obvious clues. The term 'non-obvious Hydrocarbon Play' is therefore given to a Hydrocarbon Play which is detected through clues and speculation in text for the existence of Hydrocarbon Play Elements, that is not explicitly stated.

The following codes are used for Hydrocarbon Play Elements in this specification:
[MAT]=Maturation
[SR]=Source Rock
[MIG]=Migration
[RES]=Reservoir
[TRAP]=Trap
[SEAL]=Seal
[HC_OCC]=Hydrocarbon Occurrence The system architecture (FIG. 1/FIG. 2) is intended as an example, not to impose any architectural limitations on other possible embodiments. FIG. 1 identifies the components comprising of non-volatile hardware storage (disk) 102 that may or may not be attached to a computer network 104, computer memory (RAM) 106, at least one computer processing unit (CPU) 108, and instruction filter 110. The transformed output may be visualized through a number of devices 114 which may or may not be connected through a computer network 112. Certain embodiments of the display include (but are not limited to), a mobile phone, tablet device, virtual reality headset, computer monitor and immersive projection devices. Embodiment may be entirely through hardware, software or a combination of both, all of which could be considered a 'circuit' or 'module'.

In FIG. 2 an example of the overall system, a user 202 interacts through an interface 204 with the transformed derived information products generated by modules 206 in a computer program 208 running on a computer operating system 210. Computer program languages could include (but are not limited to) Python, R, C++, Java etc.

The method operations (FIG. 3) can be sub-divided into seven main areas. Firstly, an initial reading of a sentence from a plurality of sentences (from a file from a plurality of files) into memory and instructions to prepare the text for processing. Petroleum Geoscience lexicons and Machine Learning (ML) models are also received into memory 302. Secondly, a module to detect Hydrocarbon Play Elements and their context in the sentence 304. A processor checks whether any more sentences are present 306 if there are none the process moves to the third module. The third module 308 detects adjacent combinatorial sequences of Hydrocarbon Play Elements generated from 304 that have the potential to constitute a Hydrocarbon Play. A fourth module detects juxtaposed sequences of Hydrocarbon Play Elements from different documents (files) that have the potential to constitute a Hydrocarbon Play 310. A fifth module computes the rank of the potential Hydrocarbon Plays detected based on their non-obvious nature 312. A sixth module generates the output and display for a geoscientist 314. A seventh module collects explicit feedback from the end user of the system via the user interface and incorporates this in the ranking model enabling the system to learn from usage 316.

FIG. 4 elaborates on the steps taken to detect Hydrocarbon Play Elements and the context. Sentences, petroleum geoscience lexicons and ML models are read into memory and tokenized 402. A Geological Basin Name is detected through lookup lexicon lists and/or NLP rules 404. Seven Hydrocarbon Play Elements ([MAT], [SR], [MIG], [RES], [SEAL], [TRAP], [HC_OCC]) are detected using clues from the geoscience lexicons 406. For the clue terms 'migration', (clue for [MIG]), 'source' (clue for [SR]), 'mature' (clue for [MAT]) as these are polysemic (even within the narrow of domain of petroleum geoscience literature) ML models are used for Word Sense Disambiguation (WSD). These models are created from labelled sentences using Support Vector Machine (SVM) and Bayesian classifiers (or similar) in an ensemble arrangement but could include other types of embodiments such as Random Forest etc. For the clue term 'show' and 'shows' (clues for [HC_OCC]), a Part of Speech (POS) pattern method is used for WSD rather than ML Models, utilizing the POS pattern before and after these terms, as it was deemed more accurate during testing.

Where a Hydrocarbon Play Element has been detected, its non-obvious context is also detected 408. This differentiates between 'known' and 'speculative'. For example, the modal terms 'might', 'may', 'could' are deemed speculative, whilst terms such as 'known', 'proven', 'producing' are classified as obvious.

Further geoscience contexts are detected 410 relating to Geological age (Chronostratigraphy) and Lithostratigraphy. Lexicons and/or NLP rules are used to detect these contexts. Other contexts that can be extracted are shown in the sample output in FIG. 5. For Geological Time lexicon, an international standard can be used such as the 'International Geologic Time Scale'.

All the detections from 404, 406, 408 and 410 are written to a file along with the sentence text after each sentence has been processed 412 so limited computer memory is used, enabling very large datasets to be processed with limited compute power. A key differentiating embodiment from prior art is that even if no associated Geological time or lithostratigraphic context is detected in the sentence, any detected Hydrocarbon Play Elements are still written to file, they are not ignored. Another key embodiment is the preservation of the sequence, what Hydrocarbon Play Element comes after which Hydrocarbon Play Element per Geological Basin per document.

FIG. 5 shows sample output from 412 (termed Hydrocarbon Play Element DNA'). This comprises Geological Basin Names 502, locational information 504, detection number (Unique Identifier (UID)) 506, unique document sequence number 508, numerical extracted data 510, Hydrocarbon Play Element codes 512, Hydrocarbon Play Element clues from the lexicon 514, non-obvious context 'speculative' or 'known' 516, Lithostratigraphy 518, Geological Age 520, original sentence text 522, file path to parent document 524.

FIG. 6 shows the module that detects potential Hydrocarbon Plays based on pre-set patterns for adjacent Hydrocarbon Play Elements received into memory 602. These patterns include:
[SR]-[RES]-[TRAP]
[MAT]-[MIG]-[TRAP]
[MAT]-[RES]-[TRAP]
. . .

The output file from 412 (Hydrocarbon Play Element DNA' shown in FIG. 5), is received into memory one row at a time 604. The Hydrocarbon Play Element type of the previous two rows is kept in memory, forming a 'window' of three (or larger) adjacent detections. The process detects Hydrocarbon Play Elements of the same type and skips these (holding the others in place) until it detects a Hydrocarbon Play Element of a different type. For example, for a sequence pattern:
[SR]-[RES]-[RES]-[RES]-[TRAP]-[TRAP]-[SEAL]
the moving three-element window would be (sequentially):
[SR]-[RES]-[TRAP]
[RES]-[TRAP]-[SEAL]

This three-element pattern is cross referenced to pre-existing patterns 606. If a match is detected 608, the potential Hydrocarbon Play is written to file along with its contexts 610. If more rows in the input file exist, the sequence is repeated 612 or stops.

FIG. 7 shows sample output from 610. This comprises a rank score (see FIG. 10 for method) 702, the possible Hydrocarbon Play name 704, which is a concatenation of Geological Age, [RES] and [TRAP] clues (716) and the text 'Possible Play'. Those shown include 'Fluvial Possible Play', 'Pinch outs Possible Play' and 'Post rift Folding Possible Play'. Geological Basin name is shown in 706, location 708, document unique id 710, sentence unique id 712, Hydrocarbon Play Element type 714, Hydrocarbon Play Element clue terms 716, non-obvious context 718, lithostratigraphic units 720, Geological age 722, original sentence text 724 and file path to parent document 726.

FIG. 8 shows the process to detect potential Hydrocarbon Plays juxtaposed across documents. The input file from 412 (Hydrocarbon Play Element DNA') is received one row at a time 802. Every Hydrocarbon Play Element of type [SR], [RES] and [TRAP] is identified 804 where a Geological Basin and Geological Age has been associated in the sentence boundary and where that exact context occurs in two or more documents. For example, identifying [TRAP] (Triassic age, Illizi Basin) in doc id #12 and doc id #34.

This list is further processed in order to identify where the sequence 'window' (preceding and succeeding Hydrocarbon Play Elements from the same or different sentences) for those matches identified contain a Hydrocarbon Play Element not present in the other associations of the other Hydrocarbon Play Element in a different document 806.

For example, the succeeding Hydrocarbon Play Element in document id #12 to [TRAP] (Triassic) may be [SEAL] (no age detected). This Hydrocarbon Play Element may not be mentioned in the window any other document associated to [TRAP] (Triassic) for that Geological Basin. At the same time the Hydrocarbon Play Element [SR] may be the preceding association to [TRAP] (Triassic) in document id #34—but may not be mentioned in any other document associated to [TRAP] (Triassic) for that Geological Basin. A pattern can therefore emerge [SR]-[TRAP]-[SEAL] indicating a Hydrocarbon Play from a combinatorial pattern that does not exist in any single document for that Geological Basin. This 'joining' on Hydrocarbon Play Element Type and Age (or Lithostratigraphy) is a method not used before in prior art. These 'juxtaposed' potential Hydrocarbon Plays are written to file 808.

FIG. 9 shows sample output from 808. The potential Hydrocarbon Play rank 902 (see FIG. 10), name of the potential Hydrocarbon Play (concatenation of Geological Age, Reservoir and Trap with the text 'Possible Play') 904. Those shown include 'Miocene Reef Possible Play' and 'Eocene Lagoonal Possible Play'.

An example is shown 906 where the pattern [RES]-[MIOCENE] with a prior relation of [MAT] and a subsequent relation of [RES] occur in doc id #32. This is 'joined' 908 with [RES]-[MIOCENE] in doc id #35 which occurs twice, bringing in the relation of [TRAP] that does not occur in document id #32. Therefore, a pattern 910 is identified [MAT]-[RES]-[TRAP]—a potential Hydrocarbon Play—that does not exist in any single document.

FIG. 10 shows the ranking module that is used for generating output for 610 (adjacent potential Hydrocarbon Plays) and 808 (juxtaposed potential Hydrocarbon Plays). Given a set of potential Hydrocarbon Plays 1002, ranking boosts 1004 are given based on how many of the Hydrocarbon Play Elements in the potential Hydrocarbon Play have a non-obvious (speculative) context. Where contexts imply known evidence, the ranking is down boosted. A further boost is given based on the number of unique sentences used to generate the potential Hydrocarbon Play. If all the clues for example appear in the same sentence, then it is deemed likely to be more obvious, than one where the clue pieces are spread over many sentences. These output rankings 1006 are included in the outputs (610 and 808) of potential Hydrocarbon Plays.

Initially all clues have the same weight for ranking, with a simple boost of 1 for each speculative context and −1 for each known context. Collecting explicit user feedback from end users via an interface or device 1008 will allow an active learning feedback loop. Where a user provides feedback that a suggested Hydrocarbon Play is useful and not known before, the Hydrocarbon Play Element clues associated with that Hydrocarbon Play can be adjusted in the ranking model to ensure plays with 'similar' contexts receive an extra ranking boost.

The invention claimed is:

1. A method for extracting hydrocarbon plays from text performed by at least one computer processor, said method comprising:
   receiving into a computer memory sentences of text, lexicons and Hydrocarbon Play Element Type sequence codes;
   tokenizing the sentences of text;
   extracting geological basin names;
   extracting Hydrocarbon Play Element Type clues and geological age;
   extracting associated speculation sentence tone;
   associating said extractions to sentence sequence per document;
   applying a filter over said sequences to match Hydrocarbon Play Element Type sequence codes;
   using geological basin name with Hydrocarbon Play Element Type and geological age to join extractions across documents;

associating extractions to said join extractions from sentences prior to and/or preceding the join to form combinations regardless whether related extractions have an associated geological age;

wherein said combinations ranked by their level of speculation comprising:

the number of words in the Hydrocarbon Play Element Type clues within the combination;

the distance of sentences within the combination to sentences of known Hydrocarbon Play Element Types;

the occurrence of hydrocarbon or source rock as a Hydrocarbon Play Element Types in the combination;

the number of unique sentences making up the combination;

the amount of speculation tone in the sentences within the combination;

the speculative nature of the Hydrocarbon Play Element clues in the combination; and combining all these ranking parameters into a single speculative score for the combination as a whole output in a data file.

2. The method of claim 1, further includes user feedback to tune the ranking parameters.

\* \* \* \* \*